US012194956B1

(12) United States Patent
Nadgir et al.

(10) Patent No.: US 12,194,956 B1
(45) Date of Patent: Jan. 14, 2025

(54) SYSTEM AND METHOD FOR DETERMINING CORRECT USAGE OF SEAT BELT (71) Applicant: Caterpillar Inc., Peoria, IL (US)

(72) Inventors: Vijeendra Nadgir, Bellary (IN); Aswak Shanavaz, Tirupur (IN); Gowtham Kumar, Puducherry (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/423,736

(22) Filed: Jan. 26, 2024

(51) Int. Cl.
B60R 22/48 (2006.01)

(52) U.S. Cl.
CPC ...... *B60R 22/48* (2013.01); *B60R 2022/4816* (2013.01); *B60R 2022/485* (2013.01); *B60R 2022/4891* (2013.01)

(58) Field of Classification Search
CPC ............ B60R 22/48; B60R 2022/4816; B60R 2022/485; B60R 2022/4891; B60N 2/002; B60N 2/003; B60N 2/0033; B60N 2/0034
See application file for complete search history.

(56) References Cited

U.S. PATENT DOCUMENTS

| 7,812,716 B1 * | 10/2010 | Cotter | B60Q 1/509 340/468 |
| 9,878,689 B1 * | 1/2018 | Jimenez | B60R 21/0155 |
| 10,688,951 B2 | 6/2020 | Coughlin et al. | |
| 10,889,262 B2 | 1/2021 | Liau | |
| 2021/0394710 A1 | 12/2021 | Hu et al. | |

FOREIGN PATENT DOCUMENTS

| CN | 112849071 | | 5/2021 | |
| CN | 109808636 B | * | 7/2022 | ............. B60R 22/48 |
| CN | 115285062 | | 9/2023 | |
| FR | 2909174 A1 | * | 5/2008 | ............. B60N 2/002 |
| WO | 2018173115 | | 9/2018 | |

OTHER PUBLICATIONS

Ito, FR-2909174-A1, Machine Translation of Specification (Year: 2008).*
Karuppaswamy, CN-109808636-B, Machine Translation of Specification (Year: 2022).*

* cited by examiner

*Primary Examiner* — Timothy Wilhelm
*Assistant Examiner* — Matthew Joseph Ganci (57) ABSTRACT A system for determining correct usage of a seat belt by a user on a seat of a machine includes an occupancy sensor, a seat belt sensor, a sensory tag, a first detector, a second detector, and a controller. The controller is configured to determine seat occupancy based on a first signal received from the occupancy sensor and also determine a coupling of a tongue of the seat belt with a buckle based on a second signal received from the seat belt sensor. The controller is configured to determine a correct usage of the seat belt from absences of a third signal from the first detector and a fourth signal from the second detector. The controller is configured to transmit a first control signal to a prime mover of a machine to allow starting of the prime mover upon determining that the seat belt is correctly used by the user.

20 Claims, 7 Drawing Sheets

SYSTEM AND METHOD FOR DETERMINING CORRECT USAGE OF SEAT BELT

TECHNICAL FIELD

The present disclosure relates to a system for determining correct usage of a seat belt by a user on a seat of a machine and a method for determining correct usage of the seat belt by the user on the seat of the machine.

BACKGROUND

A seatbelt is provided in a vehicle so that a user, such as an operator or a passenger, is restrained to a vehicle seat at all times. In some cases, the user may wear the seatbelt incorrectly or the user may not wear the seatbelt at all. For example, the user may couple a tongue of the seatbelt with a seatbelt buckle, but the seatbelt may be positioned between the user and a backrest of the vehicle seat, without restraining the user. In another example, the user may couple the tongue with the seatbelt buckle, but the seatbelt may be disposed behind the backrest, without restraining the user. In yet another example, the user may not engage the tongue with the seatbelt buckle, due to which the user will not be restrained to the vehicle seat.

Conventional systems and methods associated with seatbelts describe means to determine whether a user has worn the seatbelt. For example, U.S. Pat. No. 9,878,689, hereinafter referred to as "the '689 patent", describes a seatbelt system that includes an occupant detector for determining occupancy of a seat by an occupant. The system also includes a seatbelt to constrain a waist and a torso of an occupant, and a coupling to couple a portion of a vehicle and the seatbelt to one another. The system further includes a reel to receive at least a portion of the seatbelt, and a tension sensor associated with the coupling and/or the seatbelt and to generate a signal indicative of tension in the seatbelt. The system also includes a deployment sensor associated with the seatbelt to generate a signal indicative of a length of the seatbelt deployed from the reel. The system includes the occupant detector to determine, based at least in part on the signals indicative of tension and the length, whether an occupant is properly wearing the seatbelt, such that the seatbelt constrains the occupant.

However, the system of the '689 patent does not describe any means to detect a dummy/false positioning of the seatbelt. For example, the system of the '689 patent may not determine a condition where the seatbelt is positioned between the user and the backrest or where the seatbelt is positioned behind the backrest. Further, users may circumvent the system described in the '689 patent and may continue to use the seatbelt in an improper way i.e., by coupling the seatbelt with the seatbelt buckle, such that the seatbelt is positioned between the user and the backrest or by positioning the seatbelt behind the backrest, without restraining the user. Thus, the system of the '689 patent does not ensure seatbelt false proofing from an improper seatbelt usage standpoint.

SUMMARY

In an aspect, a system for determining correct usage of a seat belt by a user on a seat of a machine is provided. The seat includes a basal cushion and a backrest. The system includes an occupancy sensor coupled to the basal cushion and configured to generate a first signal indicative of seat occupancy by the user. The system also includes a seat belt sensor coupled to at least one of a tongue associated with the seat belt and a buckle corresponding to the tongue. The seat belt sensor is configured to generate a second signal indicative of a coupling of the tongue with the corresponding buckle. The system further includes a sensory tag coupled to the seat belt to determine a position of the seat belt relative to the backrest. The system includes at least one first detector configured to detect the sensory tag and emit a third signal upon detecting the sensory tag. The first detector is coupled to one of a front surface and a rear surface of the backrest. The third signal is, at least in part, indicative of an incorrect usage of the seat belt. The system also includes a second detector configured to detect the sensory tag and emit a fourth signal upon detecting the sensory tag. The second detector is coupled to a lateral surface of the backrest. The lateral surface extends between the front and rear surfaces of the backrest. The fourth signal is, at least in part, indicative of the incorrect usage of the seat belt. The system further includes a controller in communication with the occupancy sensor, the seat belt sensor, the first detector, and the second detector. The controller is configured to determine a key-ON event of the machine. The controller is configured to determine, based on the first signal received from the occupancy sensor, seat occupancy by the user. The controller is configured to determine, based on the second signal received from the seat belt sensor, the coupling of the tongue with the buckle. The controller is configured to determine a correct usage of the seat belt from absences of the third and fourth signals. The controller is configured to transmit a first control signal to a prime mover of the machine to allow starting of the prime mover upon determining that the seat belt is correctly used by the user.

In another aspect, a method for determining correct usage of a seat belt by a user on a seat of a machine is provided. The seat includes a basal cushion and a backrest. The method includes determining, by a controller, a key-ON event of the machine. The method includes determining, by the controller, seat occupancy by the user, based on a first signal received from an occupancy sensor. The occupancy sensor is coupled to the basal cushion. The method includes determining, by the controller, a coupling of a tongue associated with the seat belt with a buckle corresponding to the tongue, based on a second signal received from a seat belt sensor. The seat belt sensor is coupled to at least one of the tongue and the buckle. The method includes determining, by the controller, a correct usage of the seat belt from absences of a third signal from at least one first detector and a fourth signal from a second detector. The first detector is coupled to one of a front surface and a rear surface of the backrest. The second detector is coupled to a lateral surface of the backrest. The lateral surface extends between the front and rear surfaces of the backrest. The method includes transmitting, by the controller, a first control signal to a prime mover to allow starting of the prime mover of the machine upon determining that the seat belt is correctly used by the user.

In yet another aspect, a machine is provided. The machine includes a cabin. The machine also includes a seat disposed within the cabin. The seat includes a basal cushion and a backrest. The backrest has a front surface, a rear surface, and a lateral surface extending between the front and rear surfaces. The machine further includes a seat belt to restrain a user to the seat. The machine includes a system for determining correct usage of the seat belt by the user on the seat of the machine. The system includes an occupancy sensor coupled to the basal cushion and configured to generate a first signal indicative of seat occupancy by the user. The system also includes a seat belt sensor coupled to at least one of a tongue associated with the seat belt and a buckle corresponding to the tongue. The seat belt sensor is configured to generate a second signal indicative of a coupling of the tongue with the corresponding buckle. The system further includes a sensory tag coupled to the seat belt to determine a position of the seat belt relative to the backrest. The system includes at least one first detector configured to detect the sensory tag and emit a third signal upon detecting the sensory tag. The first detector is coupled to at least one of the front surface and the rear surface of the backrest. The third signal is, at least in part, indicative of an incorrect usage of the seat belt. The system also includes a second detector configured to detect the sensory tag and emit a fourth signal upon detecting the sensory tag. The second detector is coupled to the lateral surface of the backrest. The fourth signal is, at least in part, indicative of the incorrect usage of the seat belt. The system further includes a controller in communication with the occupancy sensor, the seat belt sensor, the first detector, and the second detector. The controller is configured to determine a key-ON event of the machine. The controller is configured to determine, based on the first signal received from the occupancy sensor, seat occupancy by the user. The controller is configured to determine, based on the second signal received from the seat belt sensor, the coupling of the tongue with the buckle. The controller is configured to determine a correct usage of the seat belt from absences of the third and fourth signals. The controller is configured to transmit a first control signal to a prime mover of the machine to allow starting of the prime mover upon determining that the seat belt is correctly used by the user.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
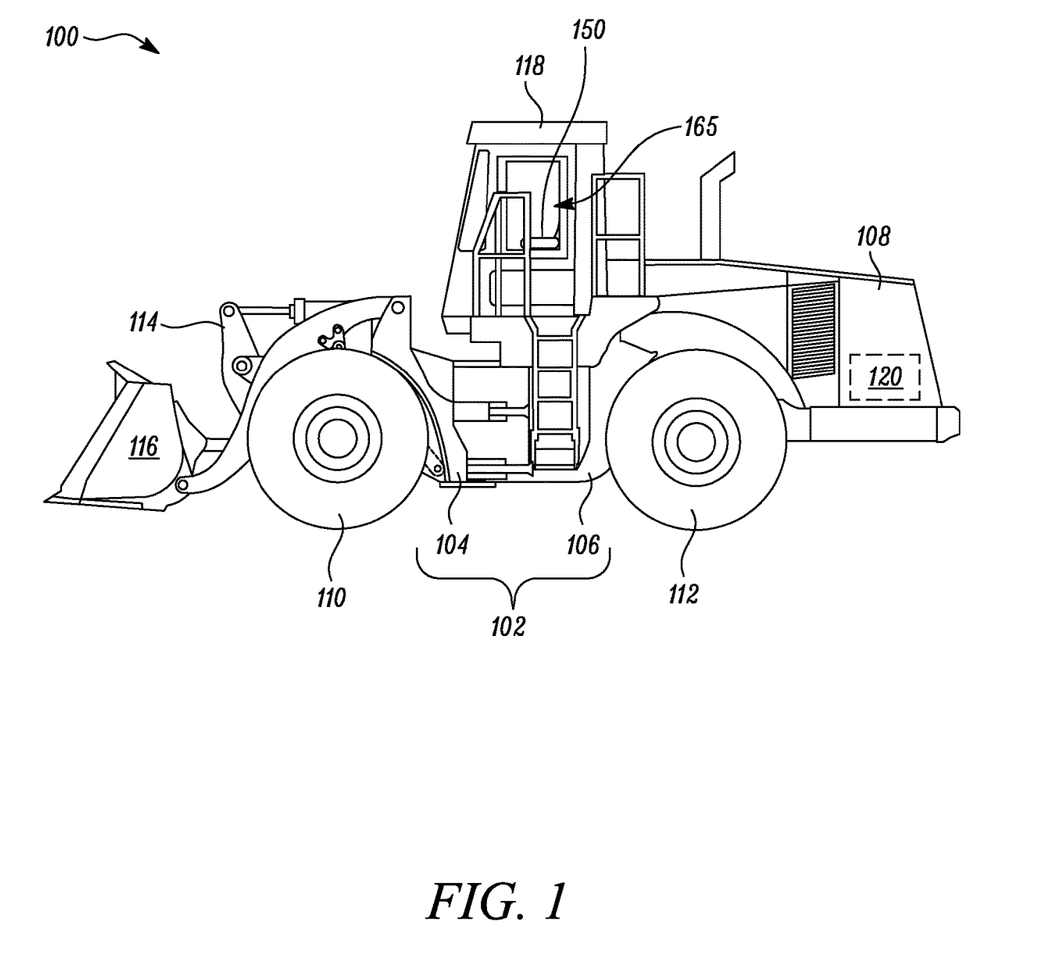
FIG. 1 is a diagrammatic side view of an exemplary machine.

Referring to FIG. 1, a diagrammatic side view of an exemplary machine 100 is illustrated. The machine 100 is embodied as a wheel loader that may be used for purposes, such as, but not limited to, construction, mining, landscaping, or agriculture. Although a wheel loader is depicted, in other examples, the machine 100 may alternatively be embodied in the form of an off-highway truck, a dozer, an excavator, a tractor, a motor grader, or a scraper, without any limitations. Such types of machines may be used in various industries to move materials from one location to another. In the foregoing examples, although heavy machinery is disclosed, such machines are used as examples for illustrating the present disclosure. In alternative embodiments, the machine 100 disclosed herein may be embodied as a light duty mobile machinery such as a passenger vehicle, e.g., a car, a bus, or any light duty mobile earthmoving machine e.g., skid steer loader in lieu of the wheel loader shown in FIG. 1, or even a stationary machine such as a gib crane without any limitation.

The machine 100 includes a frame 102 to support various components of the machine 100. In the example of the wheel loader shown in FIG. 1, the frame 102 of the machine 100 includes a front frame 104 and a rear frame 106. The machine 100 includes a hood 108 mounted on the rear frame 106. Further, the machine 100 includes a prime mover 120 disposed in the hood 108. The prime mover 120 may include an engine, a fuel cell, a battery system, electric motors, and other machine related drivetrain components that are not disclosed herein for sake of simplicity and brevity of this disclosure.

The frame 102 supports a pair of front wheels 110 and a pair of rear wheels 112. The front wheels 110 and the rear wheels 112 provide support and mobility to the machine 100 on various surfaces. Alternatively, the machine 100 may include tracks or drums instead of the front and rear wheels 110, 112.

The machine 100 also includes a linkage assembly 114 movably coupled to the frame 102. The machine 100 further includes a work tool 116 movably coupled to the frame 102 via the linkage assembly 114. In the exemplary machine 100 of FIG. 1, the work tool 116 is shown embodied as a bucket that may be used for performing loading and unloading operations. In other examples, the work tool 116 may be any other type of work tool known in the art depending on specific machine type, machine configuration, or specific application requirements.

The machine 100 also includes a cabin 118. In the example, of the wheel loader, shown in FIG. 1, the cabin 118 is supported by the rear frame 106. A user would be seated within the cabin 118 to move the machine 100 for e.g., when tramming the machine 100 or operating the work tool 116 e.g., while performing one or more work operations. The term 'user' may be used in this disclosure to reference a driver or an operator of the machine 100, or a passenger of the machine 100. For example, when the machine 100 is a work/construction machine, the user can be the operator or driver. Further, when the machine 100 is an automobile, such as a passenger vehicle, the user can be a primary user, e.g., a driver of the passenger vehicle, and a secondary user e.g., a passenger of the passenger vehicle. The cabin 118 includes a seat 150 disposed therein. The user would be seated on the seat 150 when present within the cabin 118.

Figure 2:
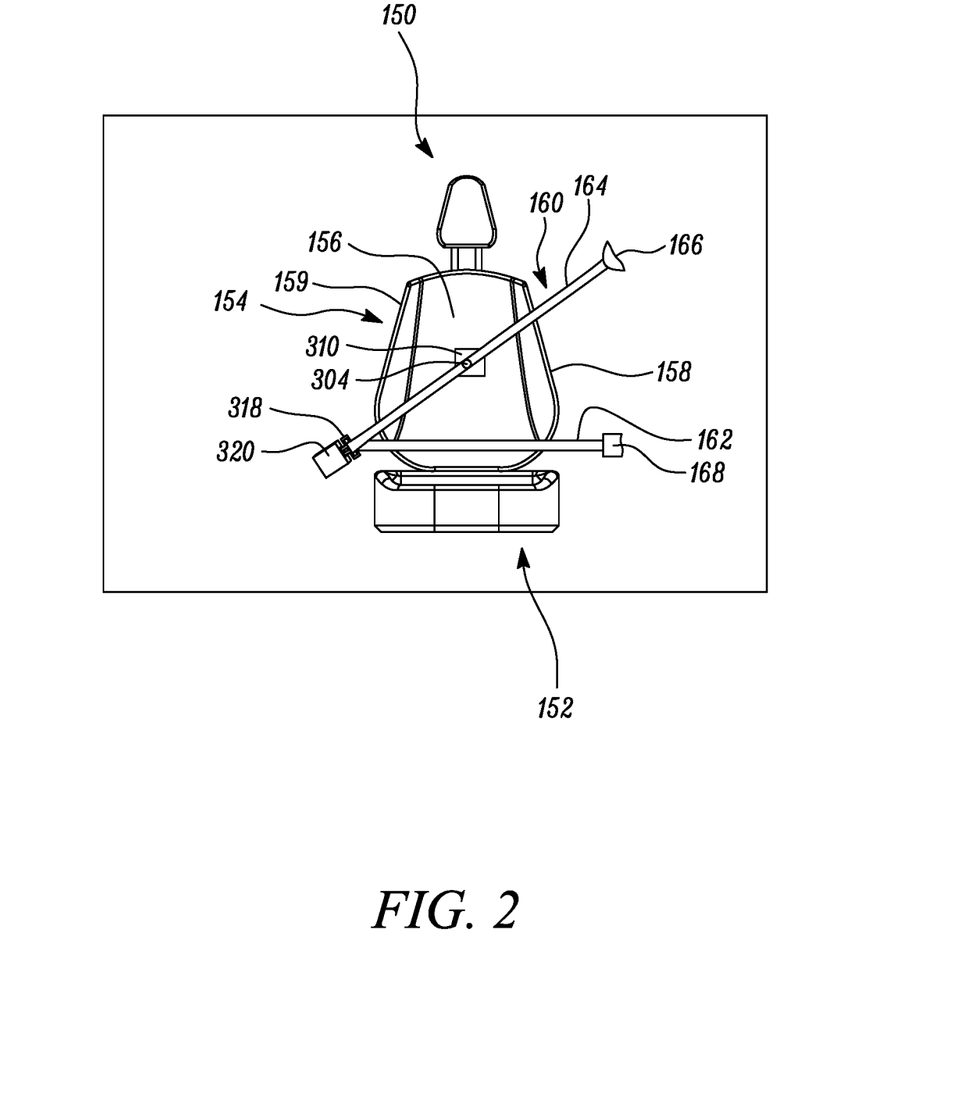
FIG. 2 is a schematic front view of an exemplary seat for the machine shown in FIG. 1.

As shown in FIG. 2, the seat 150 includes a basal cushion 152 and a backrest 154. The basal cushion 152 may be used by the user to sit thereon. The backrest 154 may provide support to a back of the user while the user is seated on the seat 150. The backrest 154 includes a front surface 156, a rear surface 157 (shown in FIG. 5A), and a lateral surface 158, 159 extending between the front and rear surfaces 156, 157 of the backrest 154. Specifically, the backrest 154 includes two lateral surfaces 158, 159. The lateral surface 158 is proximal to a point of entry 165 (shown in FIG. 1) into the machine 100 (see FIG. 1). Further, the lateral surface 159 is distal from the point of entry 165 into the machine 100.

The machine 100 further includes a seat belt 160. The seat belt 160 restrains the user to the seat 150. The seat belt 160 is worn and fastened by the user while driving or while operating the machine 100. The seat belt 160 may be retracted and disposed in a stowed position within a retractor 166 when the seat belt 160 is not in use and the seat belt 160 may be disposed in an extended position when the seat belt 160 is worn by the user. The retractor 166 is disposed adjacent to a shoulder of the user. The seat belt 160 includes a tongue 318 slidable along the seat belt 160. The tongue 318 is slidably connected to the seat belt 160. The user may pull the seat belt 160 to a sufficient length while holding out away from the retractor 166 such that the tongue 318 can slide along a length of the seat belt 160 until it can be coupled with a corresponding buckle 320. The seat belt 160 includes a lap portion 162 and a shoulder portion 164 herein, each of which are variable in length. Specifically, portions of the seat belt 160 on opposing sides of the engaged tongue 318 and the buckle 320 are hereinafter referred to as the "lap portion" and the "shoulder portion" herein.

Further, one end of the seat belt 160 is fixedly coupled to an anchor point 168 that is disposed proximal to the seat 150 and underneath the retractor 166. The anchor point 168 is adjacent to the user's hips. When the tongue 318 is coupled with the buckle 320, the lap portion 162 restrains a lower portion of the user's body against the basal cushion 152 and the shoulder portion 164 restrains an upper portion of the user's body against the backrest 154. The seat belt 160 includes a three-point seat belt system herein. Alternatively, the present disclosure may be applied to a five-point seat belt system, without any limitations.

Figure 3:
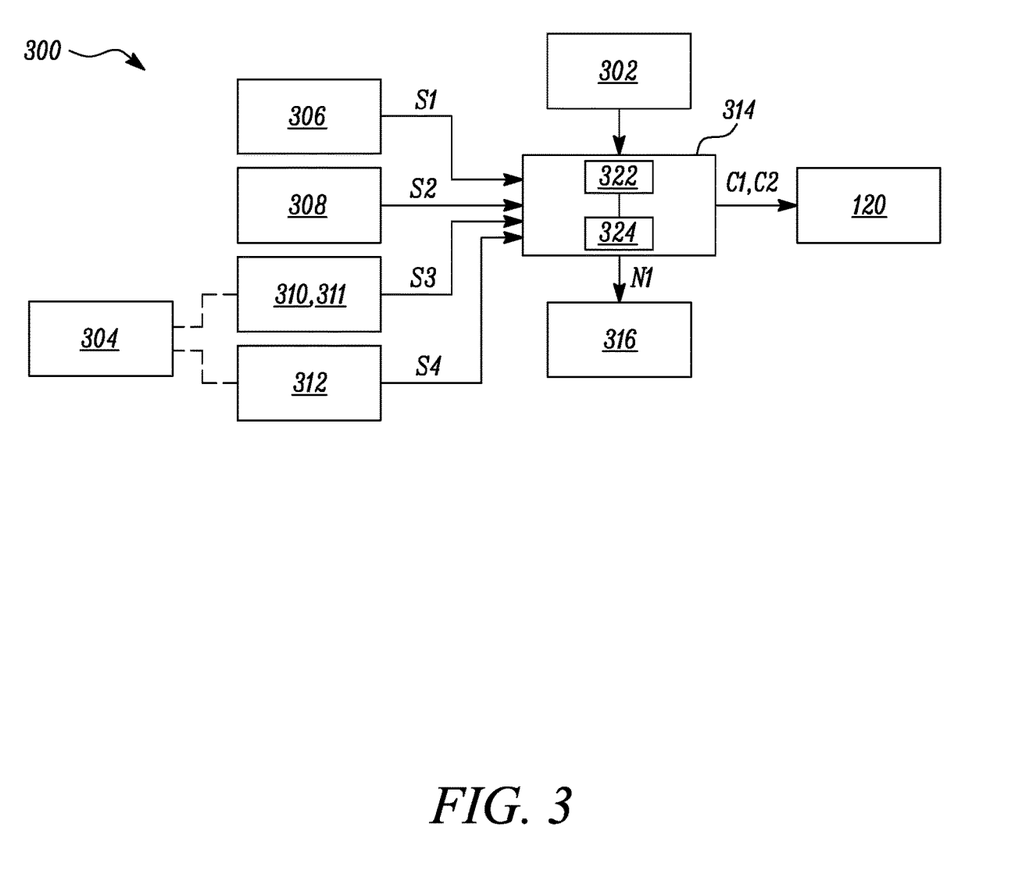
FIG. 3 is a block diagram of a system for determining correct usage of a seat belt by a user on the seat shown in FIG. 2, according to an embodiment of the present disclosure.

Referring to FIG. 3, the present disclosure relates to a system 300 for determining correct usage of the seat belt 160 (see FIG. 2) by the user on the seat 150 (see FIG. 2) of the machine 100 of FIG. 1. The term 'correct usage' as used herein indicates routing of the seat belt 160 over the user in a manner that restrains the upper and lower portions of the user's body against the backrest 154 and the basal cushion 152, respectively. As such, the correct usage of the seat belt 160 constitutes an extension of the shoulder portion 164 (see FIG. 2) from the retractor 166 (see FIG. 2) that is adjacent to one shoulder of the user, diagonally across a chest of the user, to the buckle 320 (see FIG. 2) that is adjacent to the user's hips. Further, the correct usage of the seat belt 160 also constitutes extension of the lap portion 162 (see FIG. 2) transversely across the lap of the user from the anchor point 168 (see FIG. 2) to the buckle 320.

Figure 4:
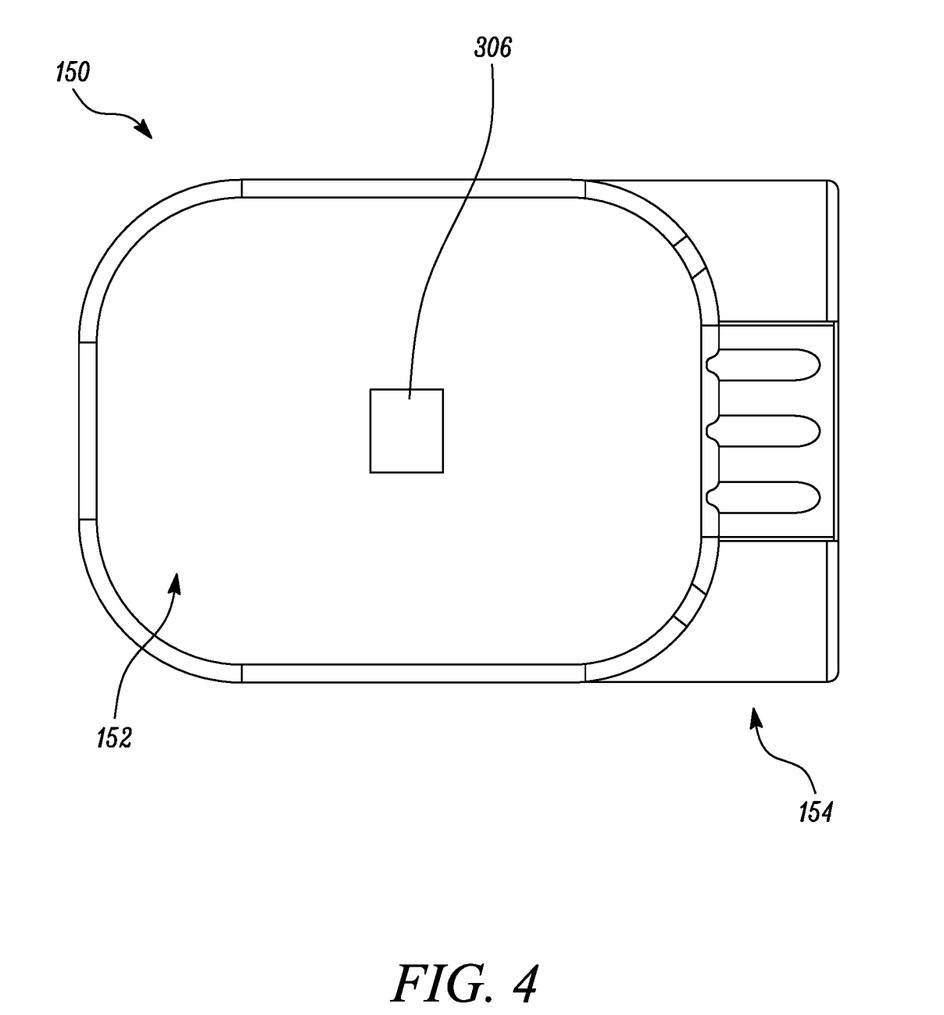
FIG. 4 is a schematic bottom view of the seat shown in FIG. 2.

As shown in FIGS. 3 and 4, the system 300 includes an occupancy sensor 306 coupled to the basal cushion 152. The occupancy sensor 306 generates a first signal S1 indicative of seat occupancy by the user. In other words, the occupancy sensor 306 detects if the user is present on the seat 150. In an example, the occupancy sensor 306 may be a load sensor that may determine the presence of a load or a weight of the user when the seat 150 is occupied by the user. In other examples, the occupancy sensor 306 may include a pressure sensor or any other type of sensor, that may provide the first signal S1 indicative of the seat occupancy, without any limitations. The occupancy sensor 306 may generate the first signal S1 in real time, and may generate the first signal S1 at predefined time intervals.

Referring to FIGS. 2 and 3, the system 300 also includes a seat belt sensor 308 coupled to the tongue 318 associated with the seat belt 160 or the buckle 320 corresponding to the tongue 318. The seat belt sensor 308 generates a second signal S2 indicative of a coupling of the tongue 318 with the corresponding buckle 320. For instance, the seat belt sensor 308 may generate the second signal S2 when the user locks the tongue 318 with the buckle 320. Thus, the seat belt sensor 308 ensures that the tongue 318 is correctly coupled with the buckle 320. The seat belt sensor 308 may generate the second signal S2 in real time, and may generate the second signal S2 at predefined time intervals. The seat belt sensor 308 may include a radio-frequency identification (RFID) sensor, an infrared sensor, a proximity sensor, and so on, without any limitations.

The system 300 further includes a sensory tag 304 coupled to the seat belt 160 to determine a position of the seat belt 160 relative to the backrest 154. In the illustrated example, the sensory tag 304 is coupled to the shoulder portion 164 of the seat belt 160. Specifically, when the tongue 318 is coupled to the buckle 320, the sensory tag 304 is disposed between the tongue 318 and the retractor 166. Alternatively, the sensory tag 304 may be coupled to any other strategic location on the seat belt 160. In the illustrated example, the sensory tag 304 is a RFID tag. In an alternate example, the sensory tag 304 may be an infrared tag, without any limitations. The sensory tag 304 may be an active type of tag, a passive type of tag, or any other suitable type of tag.

Figure 5A:
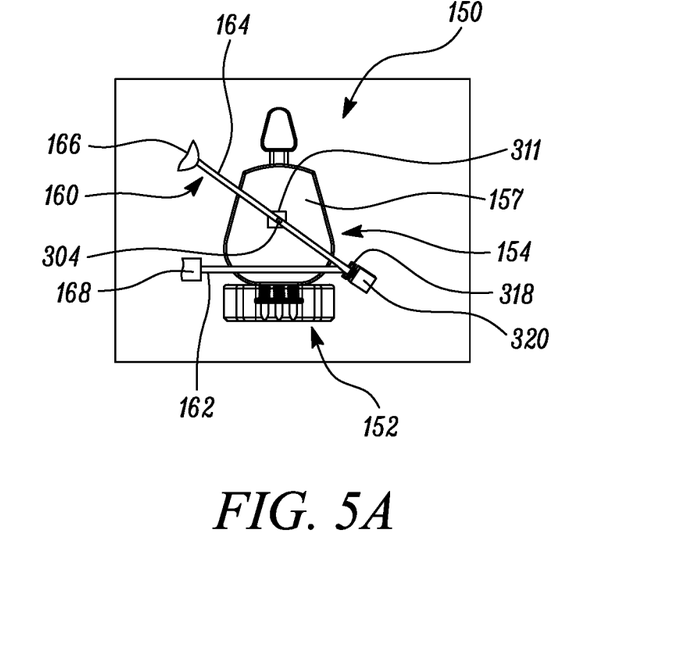
FIG. 5A is a schematic rear view of the seat shown in FIG. 2.

Referring now to FIGS. 2, 3, and 5A, the system 300 also includes one or more first detectors 310, 311 to detect the sensory tag 304 and emit a third signal S3 upon detecting the sensory tag 304. The third signal S3 is, at least in part, indicative of an incorrect usage of the seat belt 160. In other words, if the third signal S3 is generated, it is considered that the seat belt 160 is incorrectly used by the user. The first detector 310, 311 is coupled to the front surface 156 and/or the rear surface 157 of the backrest 154. In the illustrated example, the one or more first detectors 310, 311 is a RFID detector. Specifically, the first detector 310 includes a first RFID detector 310 coupled to the front surface 156 of the backrest 154. The first detector 310 will hereinafter be referred to as "the first RFID detector" and denoted using identical reference numeral "310". Further, the first detector 311 includes a second RFID detector 311 coupled to the rear surface 157 of the backrest 154. The first detector 311 will hereinafter be referred to as "the second RFID detector" and denoted using identical reference numeral "311". Alternatively, the first detectors 310, 311 may be an infrared detector, or any other type of detector, without any limitations It should be noted that the sensory tag 304 is positioned on the seat belt 160 such that, when the tongue 318 is coupled to the buckle 320 without restraining the user, the sensory tag 304 is disposed in front of the first detectors 310, 311. Further, the sensory tag 304 may be detected by the first detector 310, 311 in a number of instances. In a first instance, the sensory tag 304 may be detected by the first detector 310 when the seat belt 160 is not worn correctly and is positioned in front of the first detector 310, for example, when the seat belt 160 is disposed between the user and the first detector 310. Thus, if the seat belt 160 is disposed at the back of the user and does not restrain the user, while the user is seated on the seat 150, the first detector 310 detects the sensory tag 304 and emits the third signal S3, thereby indicating the incorrect usage of the seat belt 160.

In a second instance, as depicted in FIG. 5A, the sensory tag 304 may be detected by the first detector 311 when the seat belt 160 is not worn correctly and directly positioned in front of the first detector 311, for example, when the seat belt 160 is disposed adjacent to the rear surface 157 of the backrest 154. Thus, if the seat belt 160 is disposed directly adjacent to the rear surface 157, the first detector 311 detects the sensory tag 304 and emits the third signal S3, thereby indicating the incorrect usage of the seat belt 160. In instances wherein the seat belt 160 is correctly used by the user, the sensory tag 304 does not come in proximity to the first detectors 310, 311. In such instances, the first detectors 310, 311 do not emit the third signal S3.

Figure 5B:
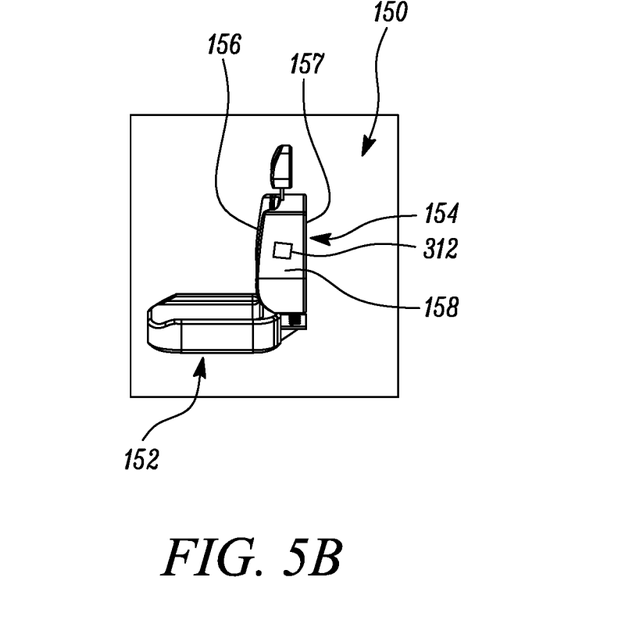
FIG. 5B is a schematic side view of the seat shown in FIG. 2.

Referring now to FIGS. 3 and 5B, the system 300 further includes a second detector 312 to detect the sensory tag 304 and emit a fourth signal S4 upon detecting the sensory tag 304. The fourth signal S4 is, at least in part, indicative of the incorrect usage of the seat belt 160. The fourth signal S4 is, at least in part, also indicative of a broken condition of the seat belt 160. The fourth signal S4 also indicates if radio-frequency signals or infrared signals being generated by the sensory tag 304 are transferred to the detectors 310, 311, 312, thereby ensuring an availability of the sensory tag 304. The second detector 312 is coupled to the lateral surface 158 of the backrest 154. Specifically, the second detector 312 is coupled to the lateral surface 158 of the backrest 154 proximal to the point of entry 165 (see FIG. 1) into the machine 100 (see FIG. 1). The lateral surface 158 is disposed opposite to a side of the seat 150 at which the buckle 320 is disposed. The second detector 312 may be positioned at a strategic location, such that the second detector 312 is in proximity to the seat belt 160 when the seat belt 160 is not fastened and is in the stowed position. In the illustrated example, the second detector 312 is a RFID detector. Alternatively, the second detector 312 may be an infrared detector, or any other type of detector, without any limitations.

It should be noted that the sensory tag 304 is positioned on the seat belt 160 such that, when the seat belt 160 is in the stowed position, the sensory tag 304 is positioned in front of the second detector 312. Further, the second detector 312 detects the sensory tag 304 when the sensory tag 304 is proximal to the second detector 312 and emits the fourth signal S4. In an example, when the seat belt 160 is not fastened by the user and is in the stowed position, the second detector 312 detects the sensory tag 304 and emits the fourth signal S4, thereby indicating that the seat belt 160 is not fastened by the user. Thus, the fourth signal S4 is used to detect a fake or dummy buckling technique of the seat belt 160 and also to detect the broken condition of the seat belt 160. In instances wherein the seat belt 160 is correctly used by the user, the second detector 312 does not emit the fourth signal S4.

It should be noted that the first detectors 310, 311 and the second detector 312 may be an active type of detector, a passive type of detector, or any other suitable type of detector.

As illustrated in FIG. 3, the system 300 further includes a controller 314. The controller 314 may include one or more memories 322 and one or more processors 324 in communication with the one or more memories 322. The memories 322 may include any means of storing information, including a hard disk, an optical disk, a floppy disk, ROM (read only memory), RAM (random access memory), PROM (programmable ROM), EEPROM (electrically erasable PROM), and/or other computer-readable memory media.

For example, the memories 322 may store data, such as, software applications, algorithms, instructions, and arithmetic operations. In an example, the memories 322 may store various types of digitally instructions, such as, software applications or algorithms, or a firmware program which may enable the processors 324 to perform a wide variety of operations.

It should be noted that numerous commercially available microprocessors may perform the functions of the processors 324. Each processor 324 may further include a general processor, a central processing unit, an application specific integrated circuit (ASIC), a digital signal processor, a field programmable gate array (FPGA), a digital circuit, an analog circuit, a microcontroller, any other type of processor, or any combination thereof. Each processor 324 may include one or more components that may be operable to execute computer executable instructions or computer code that may be stored and retrieved from the memories 322.

The controller 314 is in communication with the occupancy sensor 306, the seat belt sensor 308, the first detectors 310, 311, and the second detector 312. The controller 314 may be part of a central control module of the machine 100 (see FIG. 1), a control module associated with the prime mover 120, or may be a separate controller. The controller 314 determines a key-ON event of the machine 100. The controller 314 may be in communication with a starter 302 of the machine 100 to determine the key-ON event of the machine 100. The key-ON event may correspond to starting of the machine 100 by the user, for example, via the starter 302. The controller 314 may receive the first signal S1 from the occupancy sensor 306, the second signal S2 from the seat belt sensor 308, the third signal S3 from the first detectors 310, 311, and the fourth signal S4 from the second detector 312 either wirelessly or via wired connections.

Further, the controller 314 determines, based on the first signal S1 received from the occupancy sensor 306, seat occupancy by the user. The controller 314 also determines, based on the second signal S2 received from the seat belt sensor 308, the coupling of the tongue 318 with the buckle 320. Accordingly, based on receipt of the first and second signals S1, S2, the controller 314 determines that the seat 150 is occupied by the user and the user has fastened the seat belt 160. Further, the controller 314 determines a correct usage of the seat belt 160 from absences of the third and fourth signals S3, S4. Furthermore, the controller 314 generates a first control signal C1 to allow starting of the prime mover 120 of the machine 100 upon determining that the seat belt 160 is correctly used by the user. Moreover, the controller 314 transmits the first control signal C1 to the prime mover 120 of the machine 100 to allow starting of the prime mover 120 upon determining that the seat belt 160 is correctly used by the user. The first control signal C1 may be transmitted directly to the prime mover 120 or to the control module associated with the prime mover 120. Thus, the prime mover 120 of the machine 100 starts only when the seat 150 is occupied by the user and the user has correctly used the seat belt 160.

Further, when the user includes the operator of the machine 100 and the passenger of the machine 100, the controller 314 transmits the first control signal C1 to the prime mover 120 of the machine 100 to allow starting of the prime mover 120 upon determining that the seat belt 160 is correctly used by the operator and the passenger. Thus, if the machine 100 is a passenger car, the prime mover 120 may start only after the driver and all passengers have worn the seat belt 160 correctly.

It is to be noted that, if the sensory tag 304 is detected by the first detector 310, 311, the controller 314 receives the third signal S3 and if the sensory tag 304 is detected by the second detector 312, the controller 314 receives the fourth signal S4. The reception of the third or fourth signals S3, S4 indicates that the seat belt 160 is not correctly fastened or worn by the user. In such circumstances, the controller 314 may not generate the first control signal C1 and the prime mover 120 remains in an OFF state.

It should be further noted that the controller 314 may keep receiving the first and second signals S1, S2, and the third and fourth signals S3, S4 even after the prime mover 120 has started. Further, the controller 314 determines, based on receipt of the third or fourth signals S3, S4, the incorrect usage of the seat belt 160 by the user. The receipt of the third or fourth signals S3, S4 may indicate that the seat belt 160 is not being used correctly by the user.

Moreover, the controller 314 transmits, based on determining the incorrect usage of the seat belt 160, a second control signal C2 to one of turn off the prime mover 120 of the machine 100 and/or a notification N1 to the user to correctly use the seat belt 160. Specifically, in some instances, the controller 314 may generate the notification N1 and transmit the notification N1 to a user interface 316. The user interface 316 is positioned within the cabin 118 (see FIG. 1). The user interface 316 may include any input/output module, a portable/handheld device, a tablet, a smartphone, and so on.

If the user responds to the notification N1 and correctly uses the seat belt 160, the machine 100 and the prime mover 120 may keep operating. However, in some cases, the controller 314 may transmit a predetermined number of the notifications N1, such as, two or more notifications N1 at predefined time intervals. If the user does not respond to the notifications N1 and fails to correctly use the seat belt 160, the controller 314 may transmit the second control signal C2 to turn off the prime mover 120. In some instances, the controller 314 may generate and transmit both the notification N1 as well as the second control signal C2 to turn off the prime mover 120 of the machine 100. Further, the second control signal C2 may be sent directly to the prime mover 120 or to the control module associated with the prime mover 120. Furthermore, when the prime mover 120 is the engine, the controller 314 may cut-off fuel supply to the engine, based on determining the incorrect usage of the seat belt 160.

In an example, the notification N1 may be a visual notification, such as, a text message, an icon, a video message, and so on, to the user interface 316 regarding the incorrect usage of the seat belt 160. In another example, the notification N1 may be an audio notification, such as, a voice message, an alarm, a buzzer, and so on, or an audiovisual notification, without any limitations.

Further, in some examples, the controller 314 may also determine the broken condition of the seat belt 160 based on receipt of the fourth signal S4. More particularly, if the seat belt 160 is broken, the second detector 312 may continuously generate and transmit the fourth signal S4, as the seat belt 160 will be positioned in the stowed position and the second detector 312 will be proximal to the sensory tag 304. Furthermore, the controller 314 may transmit a notification to the user interface 316 to notify the user regarding the broken seat belt 160.

In some examples, the system 300 may further include a battery (not shown) operatively coupled to components, such as, the occupancy sensor 306, the sensory tag 304, the seat belt sensor 308, the first detectors 310, 311, the second detector 312, and the controller 314. The battery may provide a required voltage to the components of the system 300 for operation. In another example, each or a few of the components of the system 300 may have an in-built battery that provides the required voltage for working.

Figure 6:
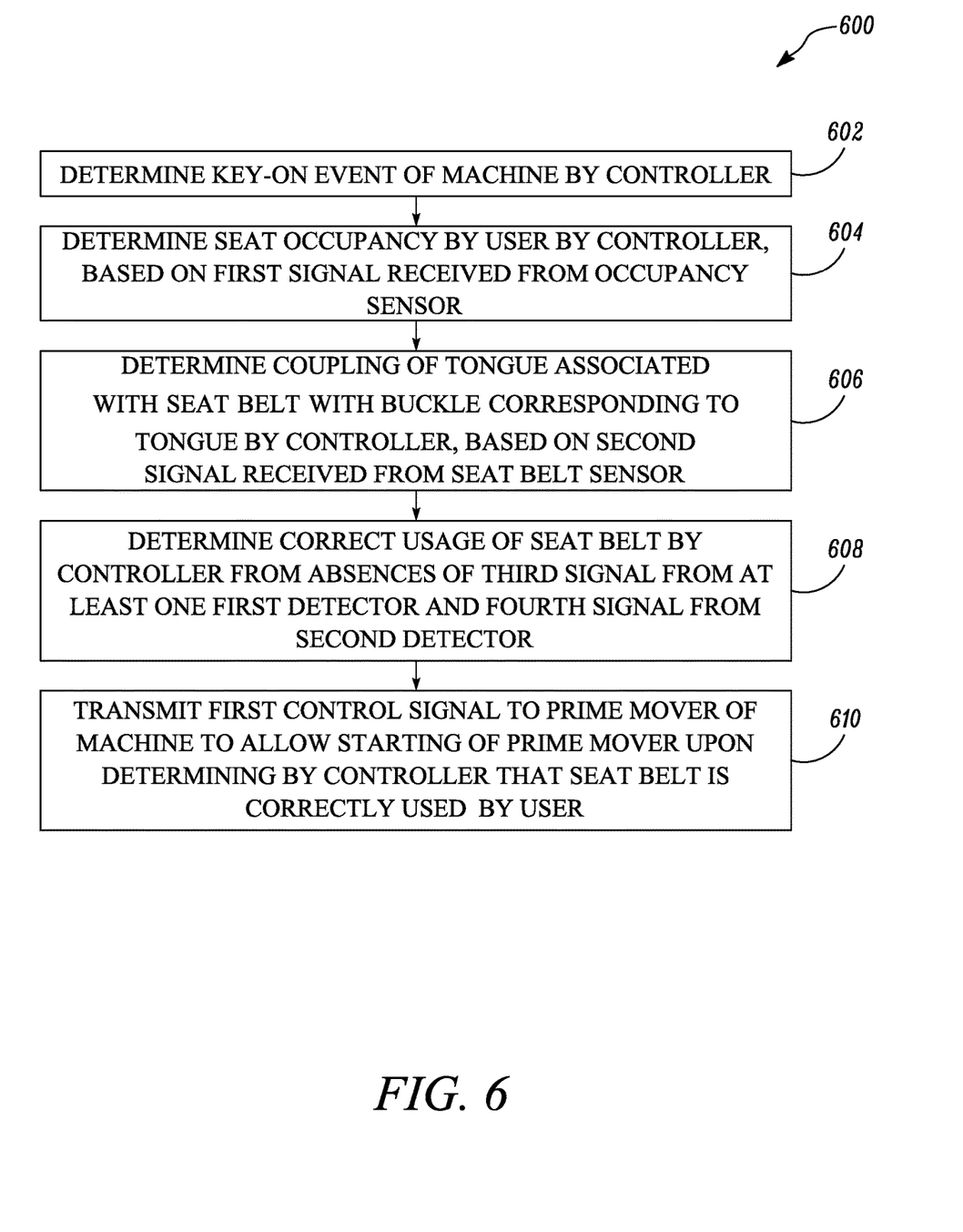
FIG. 6 is a flowchart depicting a method for determining the correct usage of the seat belt by the user on the seat of the machine shown in FIG. 1, according to an embodiment of the present disclosure.

FIG. 6 depicts a flowchart of a method 600 for determining the correct usage of the seat belt 160 by the user on the seat 150 of the machine 100. Referring to FIGS. 2 to 6, at step 602, the controller 314 determines the key-ON event of the machine 100. At step 604, the controller 314 determines the seat occupancy by the user, based on the first signal S1 received from the occupancy sensor 306. The occupancy sensor 306 is coupled to the basal cushion 152.

At step 606, the controller 314 determines the coupling of the tongue 318 associated with the seat belt 160 with the buckle 320 corresponding to the tongue 318, based on the second signal S2 received from the seat belt sensor 308. The seat belt sensor 308 is coupled to the tongue 318 of the seat belt 160 or the buckle 320.

At step 608, the controller 314 determines the correct usage of the seat belt 160 from absences of the third signal S3 from the one or more first detectors 310, 311 and the fourth signal S4 from the second detector 312. The first detector 310, 311 is coupled to one of the front surface 156 and the rear surface 157 of the backrest 154 and emits the third signal S3 upon detecting the sensory tag 304 coupled to the seat belt 160. The second detector 312 is coupled to the lateral surface 158 of the backrest 154 and emits the fourth signal S4 upon detecting the sensory tag 304. Specifically, the second detector 312 is coupled to the lateral surface 158 of the backrest 154 proximal to the point of entry 165 into the machine 100.

At step 610, the controller 314 transmits the first control signal C1 to the prime mover 120 of the machine 100 to allow starting of the prime mover 120 upon determining that the seat belt 160 is correctly used by the user.

In an example, each of the first detector 310, 311 and the second detector 312 is the RFID detector, and the sensory tag 304 is the RFID tag. Accordingly, in an example, the first detector 310 includes the first RFID detector 310 coupled to the front surface 156 of the backrest 154. The method 600 includes a step (not shown) at which the controller 314 determines the correct usage of the seat belt 160 from the absence of the third signal S3 from the first RFID detector 310. In an example, the first detector 311 includes the second RFID detector 311 coupled to the rear surface 157 of the backrest 154. The method 600 includes a step (not shown) at which the controller 314 determines the correct usage of the seat belt 160 from the absence of the third signal S3 from the second RFID detector 311.

The method 600 also includes a step (not shown) at which the controller 314 determines the incorrect usage of the seat belt 160, based on receipt of the third or fourth signals S3, S4. The method 600 further includes a step (not shown) at which the controller 314 transmits the second control signal C2 to turn off the prime mover 120 of the machine 100 and/or the notification N1 to the user to correctly use the seat belt 160, based on determining the incorrect usage of the seat belt 160.

It should be noted that one or more of the steps shown in FIG. 6, and/or described above, may be performed in an order different from that depicted and/or described. Furthermore, various steps could be performed together.

Figure 7:
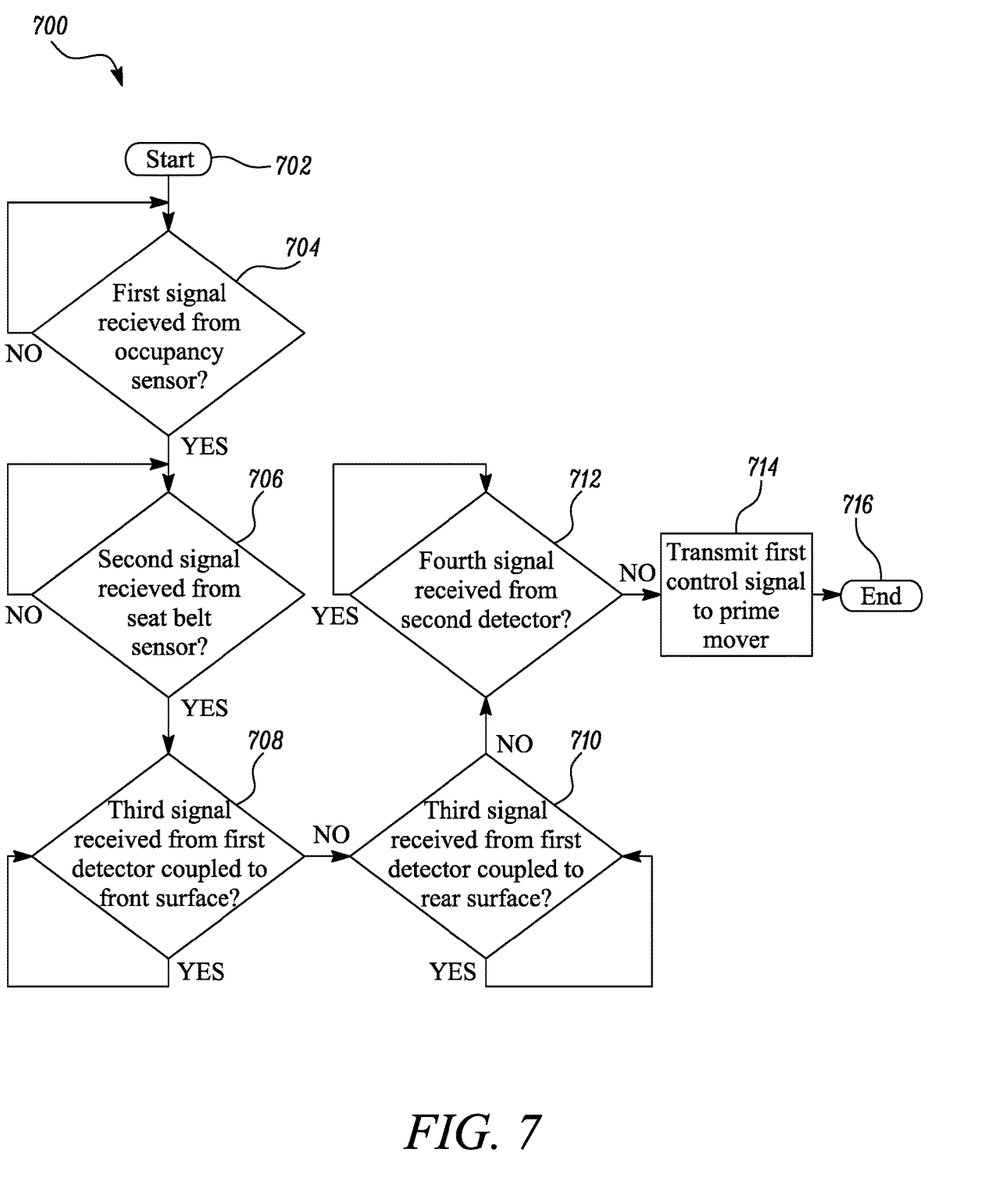
FIG. 7 is a process flowchart for low-level implementation of the method of FIG. 6, according to an embodiment of the present disclosure.

FIG. 7 is a process flowchart 700 for determining the correct usage of the seat belt 160 (see FIG. 2) by the user on the seat 150 (see FIG. 2) of the machine 100 of FIG. 1. The process 700 is a low-level implementation of the method 600 explained in relation to FIG. 6. Referring to FIGS. 3 and 7, the process 700 may be stored in the memories 322 of the controller 314 and retrieved for execution by the processors 324 of the controller 314.

At a block 702, the process 700 starts operation based on the determination of the key-ON event of the machine 100. At a block 704, the controller 314 determines seat occupancy by the user based on receipt of the first signal S1 from the occupancy sensor 306. If the seat 150 is not occupied, the controller 314 keeps checking whether the seat 150 is occupied by the user, based on response from the occupancy sensor 306. However, if the controller 314 determines that the seat 150 is occupied, the process 700 moves to a block 706.

At the block 706, the controller 314 determines if the tongue 318 of the seat belt 160 is coupled with the buckle 320 based on the second signal S2 received from the seat belt sensor 308. If the tongue 318 is not locked, the controller 314 keeps checking if the tongue 318 is coupled with the buckle 320, based on response from the seat belt sensor 308. However, if the controller 314 determines that the tongue 318 is coupled with the buckle 320, the process 700 moves to a block 708. At the block 708, the controller 314 determines whether the third signal S3 is received from the first detector 310 that is coupled to the front surface 156 of the backrest 154 or not. If the third signal S3 is received from the first detector 310, thereby indicating that the seat belt 160 is being incorrectly used, the controller 314 keeps checking if the position of the seat belt 160 has been corrected or not, based on response from the first detector 310. However, if the controller 314 does not receive the third signal S3 from the first detector 310, the process 700 moves to a block 710.

At the block 710, the controller 314 determines whether the third signal S3 is received from the first detector 311 coupled to the rear surface 157 of the backrest 154 or not. If the third signal S3 is received from the first detector 311, thereby indicating that the seat belt 160 is being incorrectly used, the controller 314 keeps checking if the position of the seat belt 160 has been corrected or not, based on response from the first detector 311. However, if the controller 314 does not receive the third signal S3 from the first detector 311, the process 700 moves to a block 712.

At the block 712, the controller 314 determines whether the fourth signal S4 is received from the second detector 312 coupled to the lateral surface 158 of the backrest 154. If the fourth signal S4 is received from the second detector 312, thereby indicating that the seat belt 160 is being incorrectly used, the controller 314 keeps checking if the position of the seat belt 160 has been corrected or not, based on response from the second detector 312. However, if the controller 314 does not receive the fourth signal S4 from the second detector 312, the process 700 moves to a block 712.

At the block 714, in the absence of the third and fourth signals S3, S4, the controller 314 transmits the first control signal C1 to the prime mover 120 of the machine 100 to allow starting of the prime mover 120 upon determining that the seat belt 160 is correctly used by the user. The process 700 then moves to the block 716, where the process 700 terminates operation.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the system 300 for determining correct/proper usage of the seat belt 160 by the user on the seat 150 of the machine 100. Further, the system 300 also detects false seat belt wearing techniques. The system 300 described herein determines if the seat belt 160 is correctly used by the user before starting the prime mover 120 of the machine 100. Further, the system 300 continuously monitors whether the seat belt 160 has been correctly user by the user even when the prime mover 120 is in operation. Furthermore, if the controller 314 of the system 300 determines that the seat belt 160 is not correctly used by the user, the system 300 may take preventive measures by turning off the prime mover 120 of the machine 100 in case the position of the seat belt 160 is not corrected, for example, after transmitting the notifications N1. Thus, the system 300 may ensure that the user of the machine 100 wears the seat belt 160 correctly at all times.

The system 300 includes the first detectors 310, 311 and the second detector 312 that may ensure seat belt false proofing from an improper seat belt usage standpoint. Specifically, the first detectors 310, 311 and the second detector 312 are positioned at strategic locations on the seat 150 that may assist in false proofing in case of dummy/incorrect seat belt usage by users while using minimal sensing techniques. The second detector 312 may prevent false/dummy usage of the seat belt 160 and also ensures that the seat belt 160 is functioning in an intended manner. Specifically, the second detector 312 of the system 300 may provide the notification if the seat belt 160 is broken.

Incorporation of the system 300 may reduce a probability of users to circumvent the system 300, and use the seat belt 160 in an improper way or avoid wearing the seat belt 160 altogether. Furthermore, the system 300 described herein may be retrofitted on exiting machines.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of the disclosure. Such embodiments should be understood to fall within the scope of the present disclosure as determined based upon the claims and any equivalents thereof.

The invention claimed is:

1. A system for determining correct usage of a seat belt by a user on a seat of a machine, the seat including a basal cushion and a backrest, the system comprising:
   an occupancy sensor coupled to the basal cushion and configured to generate a first signal indicative of seat occupancy by the user;
   a seat belt sensor coupled to at least one of a tongue associated with the seat belt and a buckle corresponding to the tongue, the seat belt sensor is configured to generate a second signal indicative of a coupling of the tongue with the corresponding buckle;
   a sensory tag coupled to the seat belt to determine a position of the seat belt relative to the backrest;
   at least one first detector configured to detect the sensory tag and emit a third signal upon detecting the sensory tag, wherein the first detector is coupled to one of a front surface and a rear surface of the backrest, wherein the third signal is, at least in part, indicative of an incorrect usage of the seat belt;

a second detector configured to detect the sensory tag and emit a fourth signal upon detecting the sensory tag, wherein the second detector is coupled to a lateral surface of the backrest, the lateral surface extends between the front and rear surfaces of the backrest, wherein the fourth signal is, at least in part, indicative of the incorrect usage of the seat belt; and a controller in communication with the occupancy sensor, the seat belt sensor, the first detector, and the second detector, wherein the controller is configured to:
determine a key-ON event of the machine;
determine, based on the first signal received from the occupancy sensor, seat occupancy by the user;
determine, based on the second signal received from the seat belt sensor, the coupling of the tongue with the buckle;
determine a correct usage of the seat belt from absences of the third and fourth signals; and
transmit a first control signal to a prime mover of the machine to allow starting of the prime mover upon determining that the seat belt is correctly used by the user.

2. The system of claim 1, wherein each of the first detector and the second detector is a radio-frequency identification (RFID) detector, and wherein the sensory tag is a RFID tag.

3. The system of claim 2, wherein the first detector includes a first RFID detector coupled to the front surface of the backrest.

4. The system of claim 2, wherein the first detector includes a second RFID detector coupled to the rear surface of the backrest.

5. The system of claim 1, wherein each of the first detector and the second detector is an infrared detector, and wherein the sensory tag is an infrared tag.

6. The system of claim 1, wherein the second detector is coupled to the lateral surface of the backrest proximal to a point of entry into the machine.

7. The system of claim 1, wherein the controller is configured to:
determine, based on receipt of one of the third and fourth signals, an incorrect usage of the seat belt; and
transmit, based on determining the incorrect usage of the seat belt, one of a second control signal to turn off the prime mover of the machine and a notification to the user to correctly use the seat belt.

8. The system of claim 1, wherein the fourth signal is, at least in part, indicative of a broken condition of the seat belt, and wherein the controller is configured to determine the broken condition of the seat belt based on receipt of the fourth signal.

9. The system of claim 1, wherein, when the user includes an operator of the machine and a passenger of the machine, the controller is configured to transmit the first control signal to the prime mover of the machine to allow starting of the prime mover upon determining that the seat belt is correctly used by the operator and the passenger.

10. A method for determining correct usage of a seat belt by a user on a seat of a machine, the seat including a basal cushion and a backrest, the method comprising:
determining, by a controller, a key-ON event of the machine;
determining, by the controller, seat occupancy by the user, based on a first signal received from an occupancy sensor, wherein the occupancy sensor coupled to the basal cushion;
determining, by the controller, a coupling of a tongue associated with the seat belt with a buckle corresponding to the tongue, based on a second signal received from a seat belt sensor, wherein the seat belt sensor is coupled to at least one of the tongue and the buckle;
determining, by the controller, a correct usage of the seat belt from absences of a third signal from at least one first detector and a fourth signal from a second detector, wherein the first detector is coupled to one of a front surface and a rear surface of the backrest and emits the third signal upon detecting a sensory tag coupled to the seat belt, and wherein the second detector is coupled to a lateral surface of the backrest and emits the fourth signal upon detecting the sensory tag, the lateral surface extends between the front and rear surfaces of the backrest; and
transmitting, by the controller, a first control signal to a prime mover of the machine to allow starting of the prime mover upon determining that the seat belt is correctly used by the user.

11. The method of claim 10, wherein each of the first detector and the second detector is a radio-frequency identification (RFID) detector, and wherein the sensory tag is a RFID tag.

12. The method of claim 11, wherein the first detector includes a first RFID detector coupled to the front surface of the backrest, and wherein the method further includes determining, by the controller, the correct usage of the seat belt from the absence of the third signal from the first RFID detector.

13. The method of claim 11, wherein the first detector includes a second RFID detector coupled to the rear surface of the backrest, and wherein the method further includes determining, by the controller, the correct usage of the seat belt from the absence of the third signal from the second RFID detector.

14. The method of claim 10 further comprising:
determining, by the controller, an incorrect usage of the seat belt, based on receipt of one of the third and fourth signals; and
transmitting, by the controller, one of a second control signal to turn off the prime mover of the machine and a notification to the user to correctly use the seat belt, based on determining the incorrect usage of the seat belt.

15. A machine comprising:
a cabin;
a seat disposed within the cabin, the seat including a basal cushion and a backrest, the backrest having a front surface, a rear surface, and a lateral surface extending between the front and rear surfaces of the backrest;
a seat belt to restrain a user to the seat; and
a system for determining correct usage of the seat belt by the user on the seat of the machine, the system including:
an occupancy sensor coupled to the basal cushion and configured to generate a first signal indicative of seat occupancy by the user;
a seat belt sensor coupled to at least one of a tongue associated with the seat belt and a buckle corresponding to the tongue, the seat belt sensor is configured to generate a second signal indicative of a coupling of the tongue with the corresponding buckle;

a sensory tag coupled to the seat belt to determine a position of the seat belt relative to the backrest;

at least one first detector configured to detect the sensory tag and emit a third signal upon detecting the sensory tag, wherein the first detector is coupled to at least one of the front surface and the rear surface of the backrest, wherein the third signal is, at least in part, indicative of an incorrect usage of the seat belt;

a second detector configured to detect the sensory tag and emit a fourth signal upon detecting the sensory tag, wherein the second detector is coupled to the lateral surface of the backrest, wherein the fourth signal is, at least in part, indicative of the incorrect usage of the seat belt; and a controller in communication with the occupancy sensor, the seat belt sensor, the first detector, and the second detector, wherein the controller is configured to:

determine a key-ON event of the machine;

determine, based on the first signal received from the occupancy sensor, seat occupancy by the user;

determine, based on the second signal received from the seat belt sensor, the coupling of the tongue with the buckle;

determine a correct usage of the seat belt from absences of the third and fourth signals; and transmit a first control signal to a prime mover of the machine to allow starting of the prime mover upon determining that the seat belt is correctly used by the user.

16. The machine of claim 15, wherein each of the first detector and the second detector is a radio-frequency identification (RFID) detector, and wherein the sensory tag is a RFID tag.

17. The machine of claim 15, wherein the first detector includes a first RFID detector coupled to the front surface of the backrest.

18. The machine of claim 15, wherein the first detector includes a second RFID detector coupled to the rear surface of the backrest.

19. The machine of claim 15, wherein each of the first detector and the second detector is an infrared detector, and wherein the sensory tag is an infrared tag.

20. The machine of claim 15, wherein the controller is configured to:

determine, based on receipt of one of the third and fourth signals, an incorrect usage of the seat belt; and transmit, based on determining the incorrect usage of the seat belt, one of a second control signal to turn off the prime mover of the machine and a notification to the user to correctly use the seat belt.

* * * * *